United States Patent [19]
Confrey

[11] Patent Number: 6,050,694
[45] Date of Patent: Apr. 18, 2000

[54] LIGHT ASSEMBLY REMOVABLY ATTACHABLE TO RADIO AND BATTERY ASSEMBLY

[76] Inventor: William J. Confrey, 91 Turner Rd., Pearl River, N.Y. 10965

[21] Appl. No.: 09/173,588

[22] Filed: Oct. 15, 1998

[51] Int. Cl.[7] .................................................. F21V 33/00
[52] U.S. Cl. ............................................. 362/86; 362/253
[58] Field of Search ............................ 362/86, 253, 234

[56] References Cited

U.S. PATENT DOCUMENTS

| | | | |
|---|---|---|---|
| D. 364,869 | 12/1995 | Lam | D14/168 |
| D. 381,100 | 7/1997 | Fink | D26/38 |
| 3,969,796 | 7/1976 | Hodsdon et al. | 24/270 |
| 4,653,115 | 3/1987 | Holcomb | 455/128 |
| 4,703,402 | 10/1987 | Hsieh | 362/102 |
| 5,055,986 | 10/1991 | Johnson | 362/253 |
| 5,091,832 | 2/1992 | Tortola et al. | 362/109 |
| 5,109,322 | 4/1992 | Loughlin | 362/109 |
| 5,289,355 | 2/1994 | Cimock | 362/86 |

*Primary Examiner*—James Phan
*Attorney, Agent, or Firm*—Fulbright & Jaworski, LLP

[57] ABSTRACT

A light assembly housing a light source is provided to be removably attachable to a radio unit designed to be removably attachable to a battery assembly. The light assembly may be positioned between the radio unit and battery assembly, and is capable of conducting power from the battery assembly to the radio unit.

20 Claims, 3 Drawing Sheets

LIGHT ASSEMBLY REMOVABLY ATTACHABLE TO RADIO AND BATTERY ASSEMBLY

FIELD OF THE INVENTION

This invention relates to integration of a light source with a radio and power source.

BACKGROUND OF THE INVENTION

An item of equipment routinely carried by law enforcement officers is a two-way radio commonly referred to as a walkie talkie for reception and transmission of communications. In a typical configuration the radio is powered by a removably attachable battery assembly. When the battery pack is in the attached position positive and negative electrical contact is made between the terminals of the battery pack and the terminals of the radio. When the battery pack is removed it may be stored or recharged as needed. By designing the battery packs to be interchangeable, a radio may be powered by one battery pack while another battery pack is being recharged.

Another item of basic equipment carried by law enforcement officers in addition to a two-way radio is a portable light source such as a hand held flashlight. The flashlight is typically powered by batteries removably installed in a housing with terminals electrically connectable to an electric light bulb. The light from the light bulb is focused into a beam by a reflector and lens assembly.

Thus, a law enforcement officer carries a light source, a radio, and a separate power source for each. Since the light source and the radio could be powered simultaneously by a single power source, separate power sources are redundant. Moreover, since the light source and the radio are physically separate, they must occupy both hands of the officer if they are to be used simultaneously. This hampers the officer's flexibility, especially in critical situations when the officer's weapon must be drawn in self-defense or in defense of another.

Therefore, it would be desirable to provide an integrated light source and radio unit that can be held in one hand. It would also be desirable to provide a single power source to power both the light source and the radio in an integrated unit. Further, since resources for law enforcement equipment are limited, it is desirable to design a light source that can be integrated with existing radio and power source equipment.

SUMMARY OF THE INVENTION

It is therefore an object of the present invention to provide a light source that is easily integrated with existing radio and power source equipment. It is also an object of the present invention to provide a single integrated light source and radio unit that can be held in one hand. It is also an object of the present invention to provide a single power source to power both the light source and the radio in an integrated unit.

According to one aspect of the present invention a light assembly is designed to be removably attachable to an existing radio unit that is designed to be removably attachable to a battery pack assembly. A first set of terminals of the light assembly are positioned to make electrical contact with a set of terminals of the radio unit when the light assembly is attached to the radio unit.

In one embodiment the light assembly incorporates a light assembly power source that is compatible with the power requirements of both the light assembly and the radio unit. Thus, when the light assembly is attached to the radio unit, power from the light assembly power source internal to the light assembly is conducted to the terminals of the radio unit through the first set of terminals of the light assembly. The mechanism by which the light assembly is attached to the radio unit is designed to be identical to the mechanism by which the radio battery pack assembly is attached. In this way, the light assembly may be removed and replaced by the radio battery pack assembly which was designed therefor.

In an alternative embodiment the light assembly does not comprise an internal power source. Instead, the light assembly is designed to be removably attachable to the radio battery pack assembly on a side opposite the side of the light assembly to which the radio is attached. In this configuration, a second set of terminals of the light assembly would make electrical contact with a set of terminals of the radio battery pack assembly when the light assembly is attached to the radio battery pack assembly. In this way, electrical power from the radio battery pack assembly is conducted to the light assembly. The power received at the second set of terminals of the light assembly from the radio battery pack assembly may be conducted to the first set of terminals of the light assembly and be thereby conducted to the radio unit to provide power therefor.

In yet another alternative embodiment, the light assembly may be removably attachable to both the radio battery pack assembly and the radio unit, and comprise its own internal light assembly power source. In this configuration, the internal light assembly power source can provide power to the light assembly while the radio battery pack assembly provides power to the radio unit. Further, a switch can be provided to select between the light assembly power source and the radio battery pack assembly to provide power from either source to the light assembly and to the radio unit.

These and other objects aspects and features of the present invention will become better understood with reference to the following drawings and detailed written description.

DETAILED DESCRIPTION OF THE PREFERRED EMBODIMENT

Figure 1:
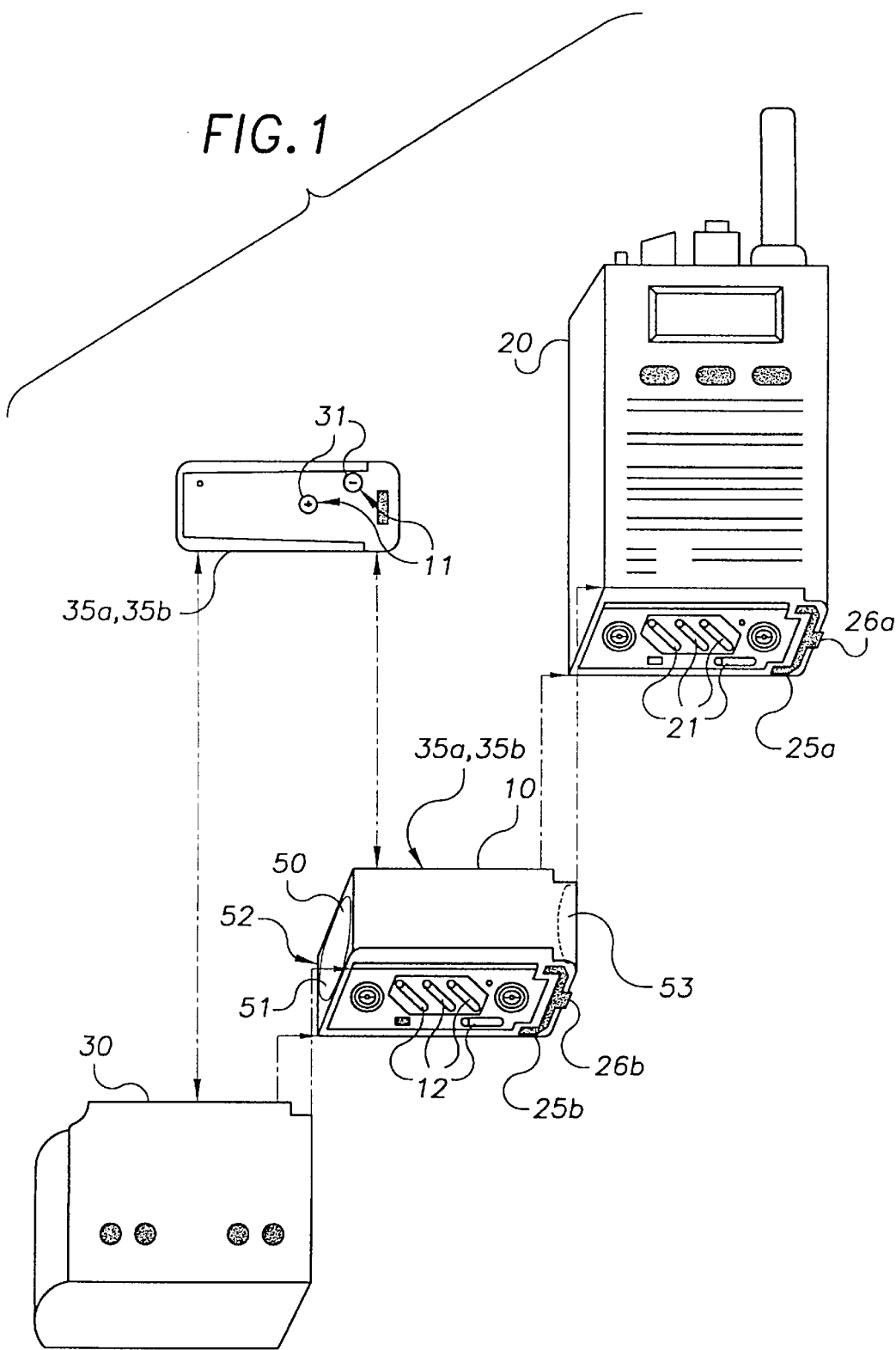
FIG. 1 is an embodiment of the invention wherein the light source is removably attachable to the radio unit and conducts power from the battery pack assembly to the radio unit.

A preferred embodiment of the present invention is illustrated in FIG. 1, wherein a light assembly 10 is designed to be removably attachable to a "walkie-talkie" radio unit 20 and a battery pack assembly 30.

In FIG. 1, light assembly 10 is shown as being removably attachable to a Motorola radio unit 20 and its corresponding battery pack assembly 30. Battery pack assembly 30 is designed to be removably attachable to radio unit 20. The mechanism for attachment of light assembly 10 to radio unit 20 is identical to the mechanism for attachment of battery pack assembly 30 to radio unit 20. Similarly, the mechanism for attachment of light assembly 10 to battery assembly 30 is identical to the mechanism for attachment of radio unit 20 to battery assembly 30.

In the case of the Motorola unit shown in FIG. 1, a slide mechanism 35a on battery assembly 30 is designed to cooperatively and securely mate with a corresponding slide mechanism 25a on radio unit 20 or identical slide mechanism 25b on light assembly 10. Similarly, slide mechanism 35b on light assembly 10 is identical to slide mechanism 35a on battery assembly 30 and cooperatively and securely mates with corresponding slide mechanism 25a on radio unit 10.

Release latch 26a is provided to release battery assembly 30 when it is to be removed from radio unit 20. Release latch 26a also provides for the release of light assembly 10 when it is to be removed from radio unit 20. Similarly, release latch 26b, which is identical to release latch 26a, is provided to release battery assembly 30 when it is to be removed from light assembly 10.

Figure 2:
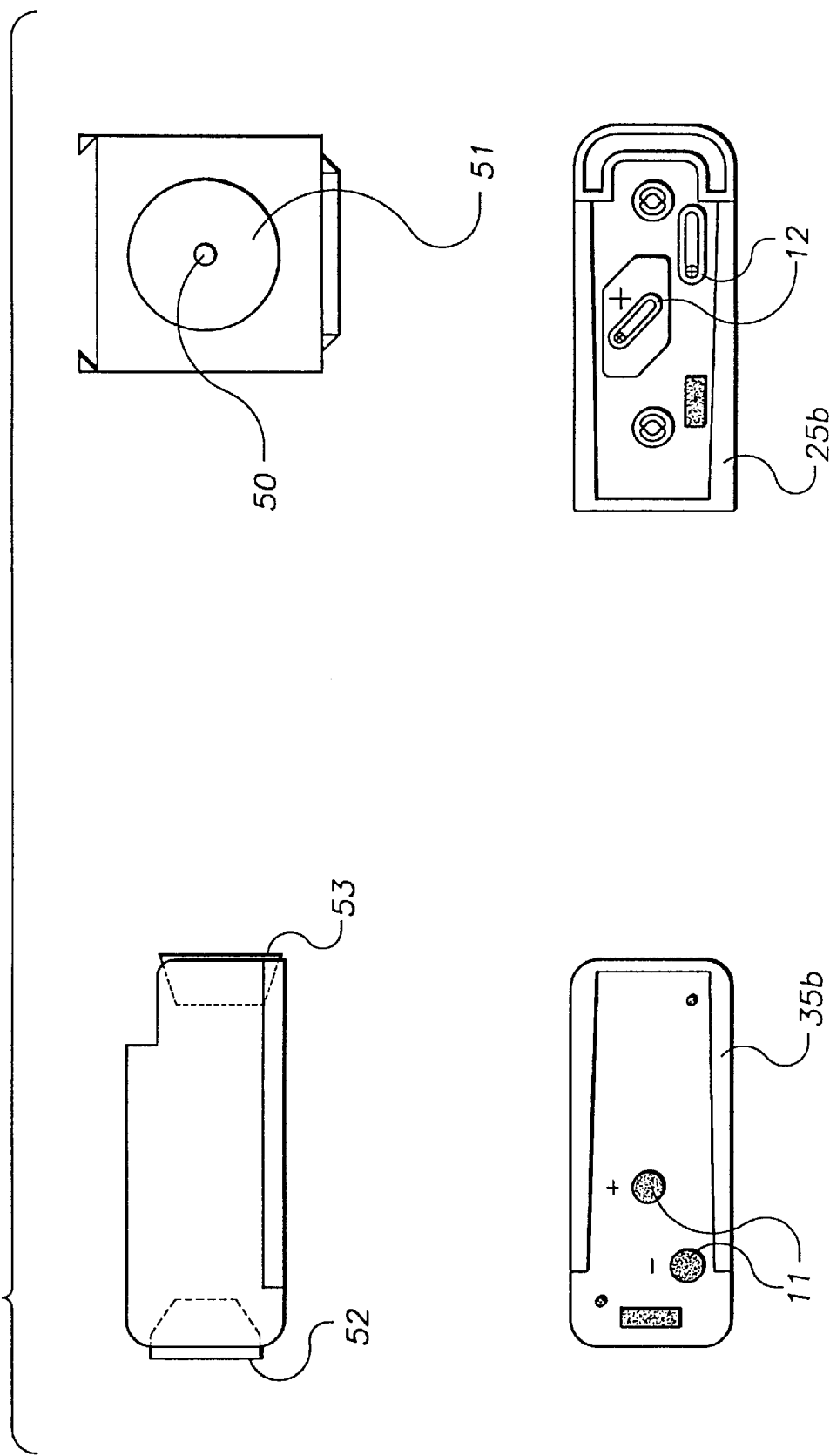
FIG. 2 is a drawing of alternative views of a light assembly of the embodiment shown in FIG. 1.

A first set of contacts 11, as shown in FIG. 2, are positioned to make electrical contact with the set of contacts 21 of radio unit 20 when radio unit 20 is attached to light assembly 10. A second set of contacts 12, also shown in FIG. 2, are positioned to make electrical contact with the set of contacts 31 of battery pack assembly 30 when battery assembly 30 is attached to light assembly 10. Internal to light assembly 10, first set of contacts 11 are electrically connected to second set of contacts 12, to enable conduction of power from battery assembly 30 to radio unit 20. Thus, light assembly 10 is designed to be easily integrated with existing radio and battery units. Persons of ordinary skill in the art would readily recognize how to construct attachment mechanisms for light assembly 10 to cooperatively and securely mate with radio unit and battery assembly of various manufacture.

Light assembly 10 comprises a light source 50. Light source 50 may be any single source or multiple sources of light known in the art or that may be developed that is capable in terms of size and power requirements to be integrated with a radio unit and battery assembly. Typically, light source 50 will comprise an electric light bulb that may be powered by conventional batteries. Light assembly will further typically comprise a reflector 51 and lens 52 to focus light from light source 50 to a concentrated light beam. An on/off switch 53 is provided to turn light source 50 on or off as desired.

In an alternative embodiment, light assembly 10 comprises an internal light assembly power source 60 (not shown) that is compatible with the power requirements of both light assembly 10 and radio unit 20. Thus, when the light assembly is attached to radio unit 20, power from light assembly power source 60 internal to light assembly 10 is conducted to contacts 21 of radio unit 20 through first set of contacts 11 of light assembly 10. In one configuration comprising light assembly power source 60, the side of light assembly 10 opposite the side of light assembly 10 attachable to radio unit 20 is sealed by a light assembly package (not shown). The mechanism by which light assembly 10 is attached to radio unit 20 is designed to be identical to the mechanism by which radio battery pack assembly 30 is attached to radio unit 20. In this way, light assembly 10 may be removed and replaced by radio battery pack assembly 30 which was designed therefor.

In yet another alternative embodiment, light assembly 10 may be removably attachable to both radio battery pack assembly 30 and radio unit 20, and comprise internal light assembly power source 60. In this configuration, internal light assembly power source 60 can provide power to light source 50 while radio battery pack assembly 30 provides power to radio unit 20. Further, a switch (not shown) can be provided to select between light assembly power source 60 and radio battery pack assembly 30 to provide power from either one to light assembly 10, to radio unit 20, or to both.

Figure 3:
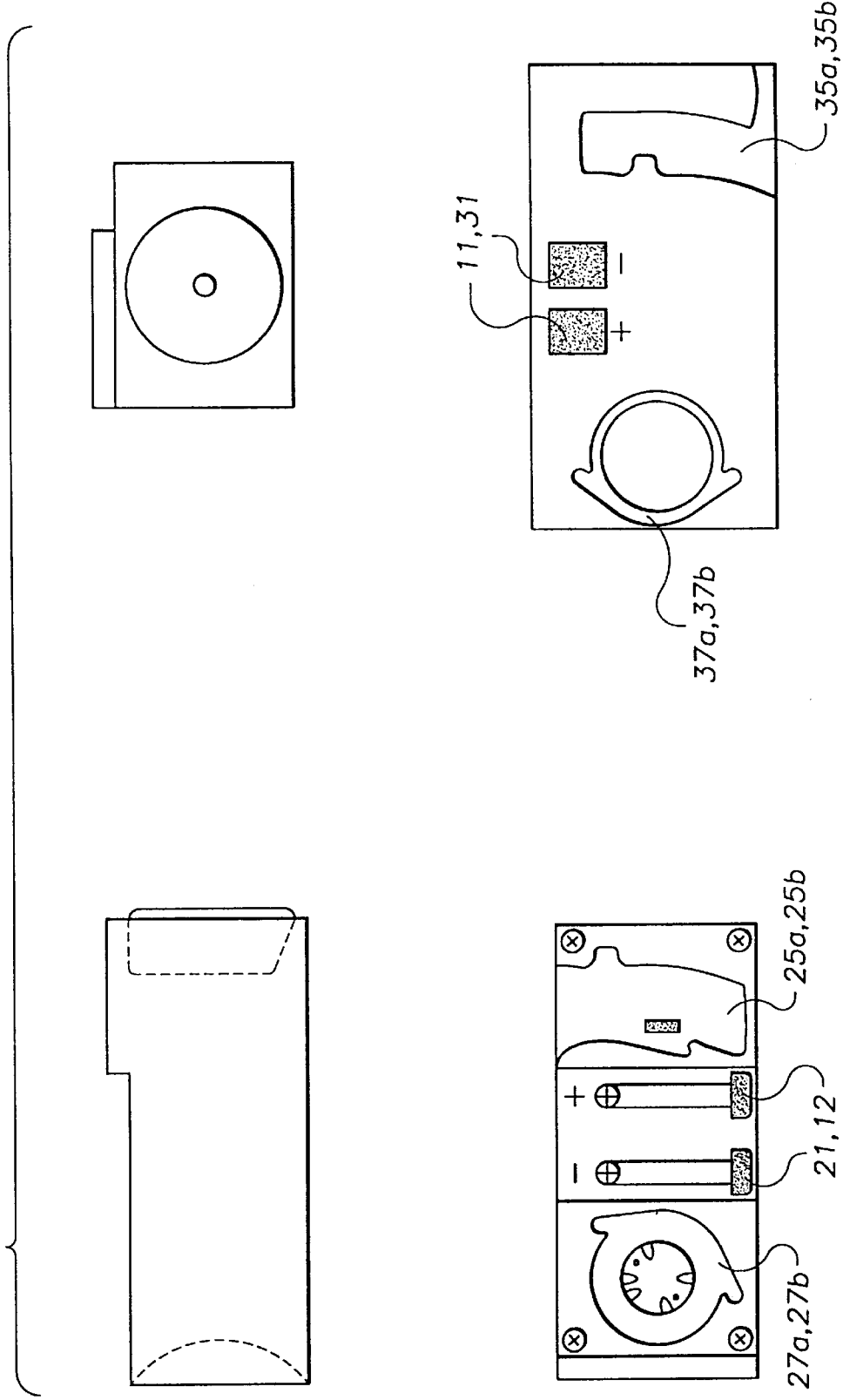
FIG. 3 is a drawing of alternative views of a light assembly of a different embodiment.

FIG. 3 illustrates light assembly 10 configured to be removably attachable to a General Electric (G.E.) radio unit 20. A battery pack assembly 30 is designed to be removably attachable to radio unit 20. The mechanism for attachment of light assembly 10 to radio unit 20 is identical to the mechanism for attachment of battery assembly 30 to radio unit 20. Similarly, the mechanism for attachment of light assembly 10 to battery assembly 30 is identical to the mechanism for attachment of radio unit 20 to battery assembly 30. Unlike the Motorola unit described above, the GE radio unit 20 is attached to battery assembly 30 by way of a bayonet mechanism similar to the bayonet mechanism for attaching a lens onto a camera.

As illustrated in FIG. 3, battery assembly 30 comprises a slide mechanism 35a designed to cooperatively and securely mate with a corresponding slide mechanism 25a on radio unit 20 or identical slide mechanism 25b on light assembly 10. Similarly, slide mechanism 35b on light assembly 10 is identical to slide mechanism 35a on battery assembly 30 and cooperatively and securely mates with corresponding slide mechanism 25a on radio unit 10.

Battery assembly 30 also comprises a mount 37a which cooperatively mates with a corresponding mount 27a on radio unit 20 or identical mount 27b on light assembly 10. Similarly, mount 37b on light assembly 10 is identical to mount 37a on battery assembly 30 and cooperatively mates with mount 27a of radio unit 10.

To removably attach battery assembly 30 to radio unit 20, mount 37a is placed against mount 27a with the battery assembly 30 and radio unit 20 at approximately right angles to a securely attached position. Then battery assembly 30 and radio unit 20 are rotated in opposite directions, while maintaining contact between mount 37a and 27a, to a position wherein slide mechanism 35a and slide mechanism 25a are securely and cooperatively mated.

To removably attach battery assembly 30 to light assembly 10, mount 37a is placed against mount 27b with the battery assembly 30 and light assembly 10 at approximately right angles to a securely attached position. Then battery assembly 30 and light assembly 10 are rotated in opposite directions, while maintaining contact between mount 37a and 27b, to a position wherein slide mechanism 35a and slide mechanism 25b are securely and cooperatively mated.

To removably attach light assembly 10 to radio unit 20, mount 37b is placed against mount 27a with light 10 and radio unit 20 at approximately right angles to a securely attached position. Then light assembly 10 and radio unit 20 are rotated in opposite directions, while maintaining contact between mount 37b and 27a, to a position wherein slide mechanism 35b and slide mechanism 25a are securely and cooperatively mated.

A first set of contacts 11, as shown in FIG. 3, are positioned to make electrical contact with the set of contacts 21 of radio unit 20 when radio unit 20 is attached to light assembly 10. A second set of contacts 12, also shown in FIG. 2, are positioned to make electrical contact with the set of contacts 31 of battery pack assembly 30 when battery assembly 30 is attached to light assembly 10. Internal to light assembly 10, first set of contacts 11 are electrically connected to second set of contacts 12, to enable conduction of power from battery assembly 30 to radio unit 20. Thus, light assembly 10 is designed to be easily integrated with existing G.E. radio and battery units. Persons of ordinary skill in the art would readily recognize how to construct attachment mechanisms for light assembly 10 to cooperatively and securely mate with radio units and battery assemblies of various manufacture.

The present invention, therefore, is well adapted to carry out the objects and attain the ends and advantages mentioned herein as well as other ends and advantages made apparent from the disclosure. While preferred embodiments of the invention have been described for the purpose of disclosure, numerous changes and modifications to those embodiments described herein will be readily apparent to those skilled in the art and are encompassed within the spirit of the invention and the scope of the following claims.

What is claimed is:

1. A light assembly housing a light source, said light assembly having one side removably attachable to a radio unit and a second side removably attachable to a battery pack assembly.

2. The light assembly of claim 1, further comprising means for providing power from the battery pack assembly to the light source.

3. The light assembly of claim 2, further comprising means for providing power from the battery pack assembly to the radio unit.

4. The light assembly of claim 1, further comprising an internal power source for providing power to the light source.

5. The light assembly of claim 4, further comprising means for providing power from the internal power source to the radio unit.

6. The light assembly of claim 4, further comprising means for conducting power from the battery pack assembly to the radio unit.

7. The light assembly of claim 4, further comprising a switch to select between said internal power source and said battery pack assembly in order to provide power to the light source.

8. The light assembly of claim 4, further comprising a switch to select between said internal power source and said battery pack assembly in order to provide power to the radio unit.

9. The light assembly of claim 4, further comprising a switch to select between said internal power source and said battery pack assembly in order to provide power to the light source and the radio unit.

10. An apparatus comprising a light assembly housing a light source, a radio unit, and a battery pack assembly, wherein one side of said light assembly is removably attachable to the radio unit and a second side of the light assembly is removably attachable to the battery pack assembly.

11. The apparatus of claim 10, wherein said light assembly comprises an internal power source for providing power to the light source.

12. The apparatus of claim 11, further comprising means for providing power from the internal power source to the radio unit.

13. The apparatus of claim 11, further comprising means for conducting power from the battery pack assembly to the radio unit.

14. The apparatus of claim 11, further comprising a switch to select between said internal power source and said battery pack assembly in order to provide power to the light source.

15. The apparatus of claim 11, further comprising a switch to select between said internal power source and said battery pack assembly in order to provide power to the radio unit.

16. The apparatus of claim 11, further comprising a switch to select between said internal power source and said battery pack assembly in order to provide power to the light source and the radio unit.

17. The apparatus of claim 11, further comprising means for conducting power from the battery pack assembly to the radio unit.

18. The apparatus of claim 10, further comprising means for conducting power from the battery pack assembly to the light source.

19. A method for providing an integrated light source and radio unit, wherein the radio unit is configured to be removably attachable to a battery pack assembly, comprising the steps of attaching a light assembly to the radio unit and attaching the battery pack assembly to the light assembly.

20. The method of claim 19 wherein the light assembly comprises an internal power source for providing power to the light source.

* * * * *

UNITED STATES PATENT AND TRADEMARK OFFICE
CERTIFICATE OF CORRECTION

PATENT NO. : 6,050,694
DATED : Apr. 18, 2000
INVENTOR(S) : William J. Confrey

It is certified that error appears in the above-indentified patent and that said Letters Patent is hereby corrected as shown below:

On <u>cover page,</u> add - - Assignee: Lightsword Inc., 91 Turner Road, Pearl River, New York - - .

Signed and Sealed this

Twentieth Day of March, 2001

Attest:

NICHOLAS P. GODICI

*Attesting Officer*     *Acting Director of the United States Patent and Trademark Office*